April 14, 1936.　　　　D. MAPES　　　　2,037,583
ACTUATING MECHANISM FOR AEROPLANE FLOTATION DEVICES
Filed Nov. 16, 1932　　　2 Sheets-Sheet 2
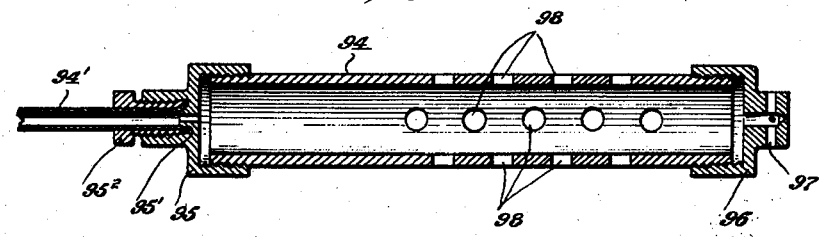
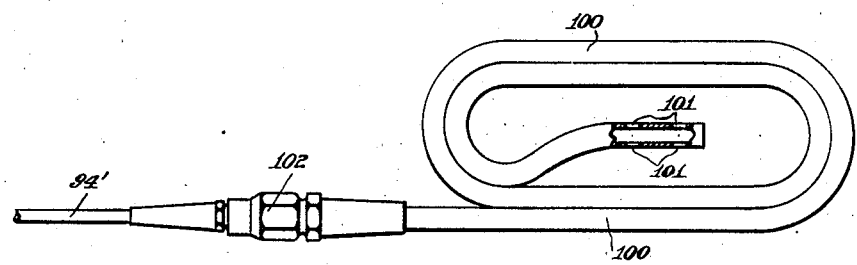
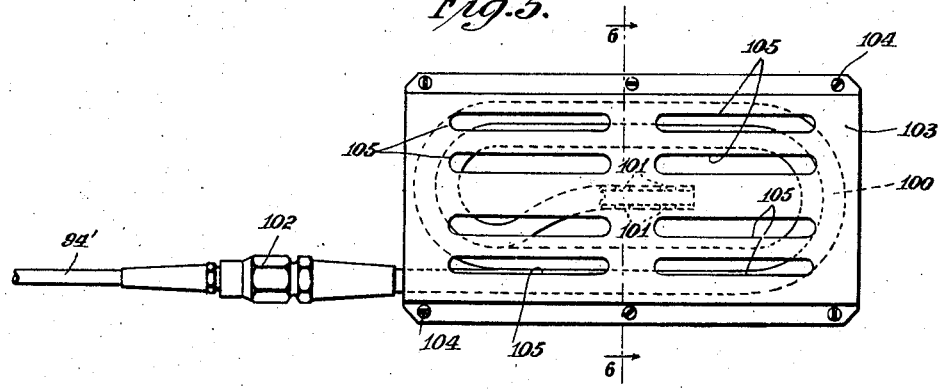
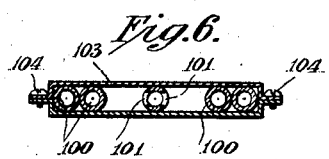
INVENTOR
Daniel Mapes
BY
Redding, Greeley, O'Shea & Campbell
ATTORNEYS Patented Apr. 14, 1936

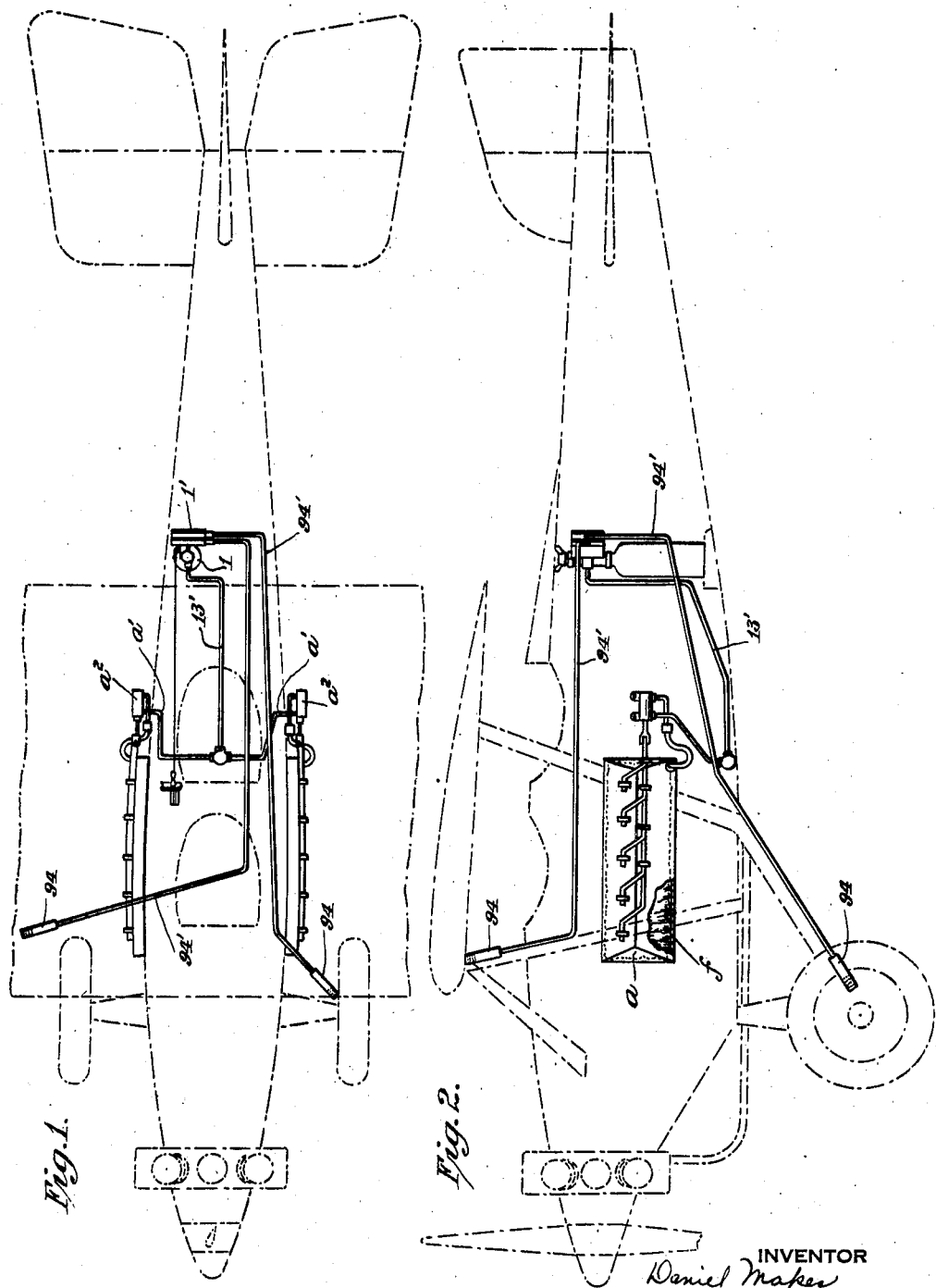

2,037,583

UNITED STATES PATENT OFFICE 2,037,583

ACTUATING MECHANISM FOR AEROPLANE FLOTATION DEVICES

Daniel Mapes, Upper Montclair, N. J., assignor to Walter Kidde & Company, Inc., New York, N. Y., a corporation of New York Application November 16, 1932, Serial No. 642,840

3 Claims. (Cl. 244—2)

The present application is a continuation in part of applicant's copending application Ser. No. 515,717 for Aeroplane flotation device, filed February 14, 1931.

The present invention relates to aeroplane flotation devices and embodies, more specifically, an actuating mechanism by means of which aeroplane flotation devices may be automatically actuated upon the descent of an aircraft upon the surface of water. More particularly, the invention embodies an improved mechanism by means of which a fluid pressure is created upon the immersion of the mechanism within a liquid and an object of the invention is to provide a mechanism of such character wherein the building up of a pressure is assured upon immersion of the device within a liquid and yet effectively prevented during operation of the aircraft.

A further object of the invention is the provision of an actuating mechanism which is simple of construction and readily manufactured and assembled, the construction being such as to facilitate inspection and effective operation of the device.

Further objects, not specifically enumerated above, will be apparent as the invention is described in greater detail in connection with the accompanying drawings, wherein:

Figure 1 is a plan view of an aeroplane flotation device as installed upon an aircraft, the aircraft being illustrated in dot and dash lines.

Figure 2 is a view in side elevation showing the apparatus of Figure 1.

Figure 3 is a view in section, taken through one of the actuating devices shown in Figures 1 and 2.

Figure 4 is a plan view showing a modified form of actuating device constructed in accordance with the present invention.

Figure 5 is a view similar to Figure 4, showing the manner in which a guard plate is placed over the actuator of Figure 4.

Figure 6 is a view in section, taken on line 6—6 of Figure 5, and looking in the direction of the arrows.

With reference to the above drawings, particularly Figures 1 and 2, a flotation mechanism for aircrafts is shown as provided with a cylinder $l$ within which a gaseous inflating medium may be contained under pressure.

This cylinder communicates with one or more inflation bags $f$ through a conduit $l3'$ and conduits $a'$. A valve $a^2$ is provided in the conduit $a'$ in order that the pressure of the inflating medium within the conduits $a'$ may be utilized to actuate a releasing mechanism for an envelope or casing $a$ within which the inflation devices are normally contained. The details of the foregoing mechanism together with the details of a release mechanism $l'$ form no part of the present invention and will therefore not be described in further detail herein.

The release mechanism is adapted to be actuated by a fluid pressure receiving through conduits $94'$, these conduits extending from actuating mechanisms $94$ which are placed at such points upon the air craft as are likely to touch water first in the event that the craft is forced down.

Figure 3 illustrates the details of the actuator $94$ shown in Figures 1 and 2. It will be seen that the actuators $94$ are connected to the release mechanism $l'$ through the conduits $94'$ and that these conduits are shown as being formed of small diameter, small bore tubing. The difficulty heretofore encountered in transmitting the actuating pressure to the release mechanism by simply dipping the small bore tubing into water has been overcome in the construction shown in Figure 3 by forming the actuator $94$ with a larger diameter than the tubing. By means of this construction the actuating fluid does not itself normally reach the release mechanism but merely compresses the air within the small bore tubing. By forming the actuator barrel $94$ of a considerably larger diameter than the small bore tubing, the resistance to the flow of the liquid in the small bore tubing is effectively overcome. The actuator barrel is connected to the tubing by a coupling member $95$ which is formed with a tapering seat $95'$ over which the end of the small bore tubing $94'$ is spread. A nut $95^2$ is threaded down over the spread end of the small bore tubing and effectively secures the fitting $95$ to the tubing. The other end of the actuator barrel $94$ is substantially closed by means of a cap $96$. Perforations $98$ are formed in the barrel and adjacent the end to which the cap $96$ is secured. It is preferred that the perforations do not extend to the fitting $95$ in order that a chamber may be provided adjacent this end of the actuator in which a pressure may be produced by the head of the liquid in which the actuator is immersed. The reason for capping the lower end of the barrel is to prevent actuation of the release mechanism due to a pressure wave caused by the barrel being placed in a rapidly moving air stream such, for example, as would be encountered if the barrel were pointed toward the nose of an aeroplane. The cap $96$ is provided with radial openings $97$ for draining any water which collects within the barrel and in as much as these openings are radial, the wind pressure externally of the barrel will not be transmitted to the interior thereof. The perforations 98 are so formed as to prevent the transmission of pressure waves to the actuating mechanism due to wind pressure externally of the barrel. To this effect the axes of the perforations preferably lie perpendicular to the axis of the barrel.

In the construction shown in Figures 4, 5, and 6, a modified actuator is illustrated. This actuator is in the form of a length of tubing 100 which may be suitably coiled and formed with openings 101 adjacent the free end thereof. The other end is secured to the small bore tubing 94' by means of a suitable fitting 102. Over this tubing 100, a housing member 103 is secured. This housing member is formed of similarly formed plates pressed into shape and secured together at the sides thereof as indicated at 104. The plates are formed with slots 105 in order that liquid may flow therebetween and into the coiled tubing 100 secured between the plates. This construction prevents the building up of an air pressure within the tubing 100 due to a rapidly moving current of air about the actuator and thus insures the actuation of the release mechanism only upon the immersion of the actuator within a liquid.

In connection with the actuator constructions described above, it will be seen that, to produce a predetermined pressure by confining a volume of air within the small bore tubing, it will be necessary that the actuator have a predetermined volume. This volume may either be obtained by variations in diameter or variations in effective length of the actuator. Of course, it will be understood that any volume greater than the aforesaid predetermined volume will be just as satisfactory, provided only that it is not too great with respect to the change in volume produced upon immersion of the actuator in a liquid.

From the foregoing, it will be seen that an actuator mechanism has been provided by means of which a fluid pressure is effectively created upon the immersion of the actuator in a liquid and while the invention has been described with reference to the specific construction shown in the accompanying drawings, it is not to be limited, save as defined in the appended claims.

I claim as my invention:

1. An actuator for actuating a pressure responsive mechanism upon immersion of the actuator in water, said actuator being adapted to be positioned normally in the atmosphere and being adapted to be immersed in water to actuate the pressure responsive mechanism upon immersion comprising a hollow cylindrical member having a fitting at one end adapted to be connected to a conduit and apertures adjacent the other end, the axes of the apertures being perpendicular to the axis of the member.

2. An actuator for actuating a pressure responsive mechanism upon immersion of the actuator in water, said actuator being adapted to be positioned normally in the atmosphere and being adapted to be immersed in water to actuate the pressure responsive mechanism upon immersion comprising a hollow cylindrical member having a fitting at one end adapted to be connected to a conduit and apertures adjacent the other end, the axes of the apertures being perpendicular to the axis of the member and the other end of the member being closed in the direction of the axis thereof.

3. Means for actuating a pressure responsive mechanism comprising a hollow cylindrical member having a fitting at one end adapted to be connected to a conduit and apertures adjacent the other end, the axes of the apertures being perpendicular to the axis of the member, the other end of the member being closed in the direction of the axis thereof and a radial passage being formed in the last named end to communicate between the chamber and the atmosphere.

DANIEL MAPES.